US006529199B1

(12) United States Patent
Lin et al.

(10) Patent No.: US 6,529,199 B1
(45) Date of Patent: Mar. 4, 2003

(54) APPARATUS AND METHOD FOR PIPELINED BUBBLE SQUEEZER

(75) Inventors: Won-Yih Lin, Hsinchu (TW); Ming-Tsan Kao, Hsinchu (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 0 days.

(21) Appl. No.: 09/426,363

(22) Filed: Oct. 25, 1999

(51) Int. Cl.[7] .................................................. G06T 1/20

(52) U.S. Cl. ........................................ 345/506; 345/419

(58) Field of Search ................................ 345/505, 506, 345/501, 502, 561, 530, 536, 418, 419–422, 643

(56) References Cited

U.S. PATENT DOCUMENTS 4,949,280 A * 8/1990 Littlefield .................. 345/505
5,613,050 A * 3/1997 Hochmuth et al. ......... 345/422
6,271,851 B1 * 8/2001 Hsiao et al. ................ 345/422
6,359,629 B1 * 3/2002 Hopcroft et al. ............ 345/423

* cited by examiner

*Primary Examiner*—Kee M. Tung
(74) *Attorney, Agent, or Firm*—Ladas & Parry

(57) ABSTRACT

There are many validity tests, such as a depth test, used to determine which pixels are valid or invalid in a 3D computer graphic rendering process. It is not necessary to display the invalid pixels on the screen, because these pixels are hidden behind other objects or other windows. The invalid pixels will eventually be discarded in the rendering process later. Conventional designs pushed pixels into a frame buffer, no matter these pixels pass the validity tests or not. The present invention presents a pipelined bubble squeezer to separate pixels into a valid group and a invalid group. The pixels in the invalid group are not pushed into the frame buffer for achieving a better performance. The pipelined bubble squeezer behaves like many bubbles floating up to the top eventually through an interconnection network of cells.

6 Claims, 7 Drawing Sheets

APPARATUS AND METHOD FOR PIPELINED BUBBLE SQUEEZER

BACKGROUND OF THIS INVENTION

1. Field of the Invention

The present invention relates to an apparatus and method for discarding invalid pixels in a 3D computer graphic system, particularly to an apparatus and method for discarding the invalid pixels using pipelined bubble squeezing in the 3D computer graphic system.

2. Description of the Related Art

It is complicated to generate a correct 3D graphic image and display it on the screen of a monitor. A lot of processes coopeerate with each other to the resulting image on the screen. For example, there is a setup process for initialization, a rasterization process for deriving a pixel coordinate, a shading process for generating smooth colors, a texture mapping process for generating the texture structure of a surface, an alpha blending process for generating transparency and translucence effects. There are many tests responsible for checking the validity of incoming pixels during a graphic rendering process. That is, if a pixel does not pass all the validity tests and is deterrmned to be invalid, then the pixel will be discarded. On the contrary, if a pixel passes all the validity tests and be considered a valid one, then the pixel will be pushed into a frame buffer. Therefore, the validity tests determine whether a pixel is going to be rendered or discarded.

The commonly adopted validity tests including a scissor test, an alpha test, a stencil test and a depth test. The scissor test is used to classify whether a pixel is inside or outside a specific view port or a rectangular window on the screen. If a pixel lies inside the rectangle window, it means the pixel passes the scissor test and then be drawn within the rectangle window. The alpha test compares the alpha value of an inconing pixel with a reference alpha value which was defined as a threshold for accepting or rejecting an incoming pixel. The stencil test compares a reference value of an input pixel with a value stored in a stencil buffer which can be modified according to some specific stencil operations. Depending on stencil testing results, the incoming pixel will be accepted or rejected. The depth test is probably the most commonly used technique to remove a hidden surface during a rendering process. A depth value of the incoming pixel is compared to a corresponding depth value stored in the depth buffer. Based on testing results, the incoming pixel is either accepted and drawn on the screen later or rejected because the incoming pixel is hidden behind an object. The depth value in the depth buffer is updated by the depth value of the incoming pixel if the incoming pixel passes the depth test.

Currently, the pixels are determined to be shown on the screen during the rendering process of the 3D computer graphic system, depending on the results of the validity tests. However, even only one invalid pixel is found and discarded later, at least one memory access is performed and thus a lot of system resources are wasted. Therefore, if we can discard the invalid pixels before the rendering process, then a lot of unnecessary memory accesses will be saved to eliminated to enhance the system performance. The present invention proposes an apparatus and a method for sequeezing pipelined bubbles to sort a set of pixels into a valid group and an invalid group according to the results of validity tests. According to the present invention, only the valid group is considered during a rendering process. The present invention is useful in speeding up a 3D computer graphic process.

SUMMARY OF THIS INVENTION

The object of the present invention is to eliminate the drawback of the low efficiency caused by an unnecessary memory access in the current 3D rendering process. To this end, the present invention provides a simplified and expandable pipelined bubble squeezer and a method for solving the above drawback. The pipelined bubble squeezer uses n×n cells to construct an interconnection network. After the validity tests, n indication bits are input in parallel to the interconnection network, and the logic value of the indication bits are sorted into continuous logic 1's and logic 0's. The interconnection network includes n buffer cells of the 0-th stage, and n×(n−1) multiplexing cells between the first stage to the (n−1)th stage. Each one of the plurality of buffer cells is constructed by a buffer only or a buffer plus a D flip flop. Each one of the plurality of multiplexing cells is constructed by a multiplexer or a multiplexer plus a D flip flop. The multiplexing cells uses a control algorithm of selecting signals or "valid bit" to pass datum upwards to a cell of the next stage or pass datum rightwards to a cell of the next stage. At every stage, the indication bits which are logic 1 are input in parallel to the interconnection network and move upwards one row, like a floating bubble. Moreover, the structure of the pipelined bubble squeezer is so regular that the structure can be expanded or abridged according to the number of the pixels processed at one time.

BRIEF DESCRIPTION OF THE DRAWINGS

This invention will be described according to the accompanying drawings in which.

PREFERRED EMBODIMENT OF THIS INVENTION

Figure 1:
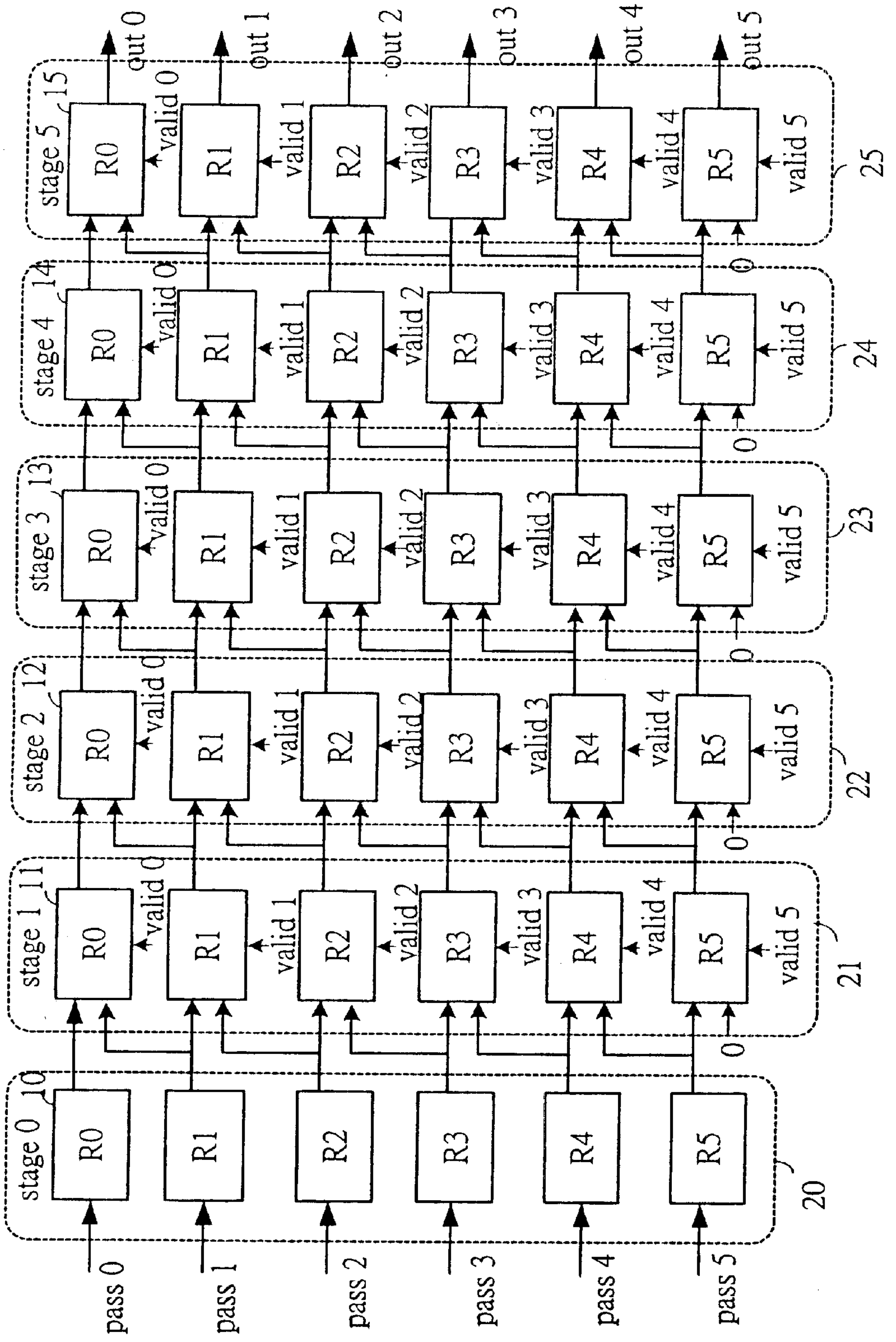
FIG. 1 shows an embodiment of the interconnection network of the pipelined bubble squeezer according to the present invention.

FIG. 1 shows an embodiment of a 6×6 interconnection network of a pipelined bubble squeezer according to the present invention, wherein 6 indication bits are input to the network in parallel after the validity testss. The interconnection network is divided into six stages, named stage 0 to stage 5. Stage 0 is composed of six buffering cells 10, called buffer stage, and each buffering cell 10 comprises a buffer or a buffer plus a D flip-flop. Stage 1 to stage 5 comprise a total of 30 multiplexing cells 11~15 and each stage is called a multiplexing stage. Each multiplexing cell comprising a multiplexer or a multiplexer plus a D flip-flop. In the following embodiment, a buffer plus a D flip-flop and a multiplexer plus a D flip-flop are adopted for displaying the data flow status in the interconnection network. The other design methodology can be done based on timing issue by adopting a buffer as a buffer cell and a multiplexer as a multiplexing cell, or by adopting a multiplexer plus a D flop-flop at each stage as a multiplexing cell. The cells of the same stage have the same function and the same synchronous operation for achieving the valid results. The multiplexing cells between stage 1 to stage 5 select their respective upper inputs if a selecting signal valid 0~valid 5 is logic 1. Otherwise, the multiplexing cells between stage 1 to stage 5 select their respective lower inputs.

The selecting signals valid 0~valid 5 of the multiplexing cells are determined by the following equations listed in table 1:

TABLE 1

| |
|---|
| valid 0 = the upper input of R0 multiplexing cell |
| valid 1 = the upper input of R1 multiplexing cell AND valid 0 |
| valid 2 = the upper input of R2 multiplexing cell AND valid 1 |
| valid 3 = the upper input of R3 multiplexing cell AND valid 2 |
| valid 4 = the upper input of R4 multiplexing cell AND valid 3 |
| valid 5 = the upper input of R5 multiplexing cell AND valid 4 |

After the validity test, each pixel has an indication bit, named pass 0~pass 5, to show if the pixel passes the validity test or not. If pass 0, for example, is a logic 1, it means the pixel passes the validity test. On the other hand, if pass 0 is a logic 0, it means the pixel fails to pass the validity test. The six input pixels of the pipelined bubble squeezer have their respective indication bits, and appear respectively at the input ends of the interconnection network.

Considering the operations of the interconnection network of the pipelined bubble squeezer in FIG. 1, all the arrows indicate the direction of data flow. For example, considering the operation of multiplexing cell R2 of stage 1. R2 multiplexing cell will receive the output of R buffering cell of stage 0, if the selecting signal valid 2 is logic 1, wherein the logic value of the selecting signal valid 2 depends on the outputs of the buffering cells R0, R1 and R2 of stage 0. Otherwise, R2 multiplexing cell will receive the output of R3 buffering cell of stage 0. Similarly, R2 multiplexing cell of stage 1 will output the result to R2 multiplexing cell of stage 2 if the selecting signal valid 2 of the multiplexing cell R2 of stage 2 is logic 1, wherein the selecting signal valid 2 of the multiplexing cell R2 of stage 2 depends on the outputs of multiplexing cells R0, R1 and R2 of stage 1. Otherwise, R2 multiplexing cell of stage 2 will output the result to R1 multiplexing cell of stage 3, if the selecting signal valid 1 of multiplexing cell R1 of stage 3 is logic 0, wherein the selecting signal valid 1 of multiplexing cell R1 of stage 3 depends on the outputs of the multiplexing cells R0 and R1 of stage 2. For the multiplexing cells between stage 1 to stage 5, the operations for determining the data flow and valid bits are similar to the above descriptions, except that the R5 multiplexing cells from stage 1 to stage 5 will receive logic 0 if the selecting signal valid 5 is logic 0.

Specifically, assume that a first zero appears in the position of the selecting signal valid 2 of stage 2 counted from the upmost end. Depending on the combination logic of table 1, it can be determined that the upper input of R2 multiplexing cell of stage 2 is logic 0, and selecting signals valid 3, valid 4, and valid 5 are all logic 0, too. It will cause the outputs of multiplexing cells R2, R3, R4 and R5 of stage 1 to be transfered to the multiplexing cells R2, R3 and R4 of stage 2, and the output of multiplexing cells R0 and R1 of stage 1 will be transferred to the multiplexing cell R0, R1 of stage 2. The indication bits below the indication bit being the first logic 0 will pop up one row after one stage operation. Thus, the bits concerned behave as bubbles floating due to being squeezed. Since the maximal number of bubbles in a n-pixel bubble squeezer is n−1, the squeezer needs n pipeline stages, including the first buffering stage, to squeeze all the bubbles out.

Figure 2:
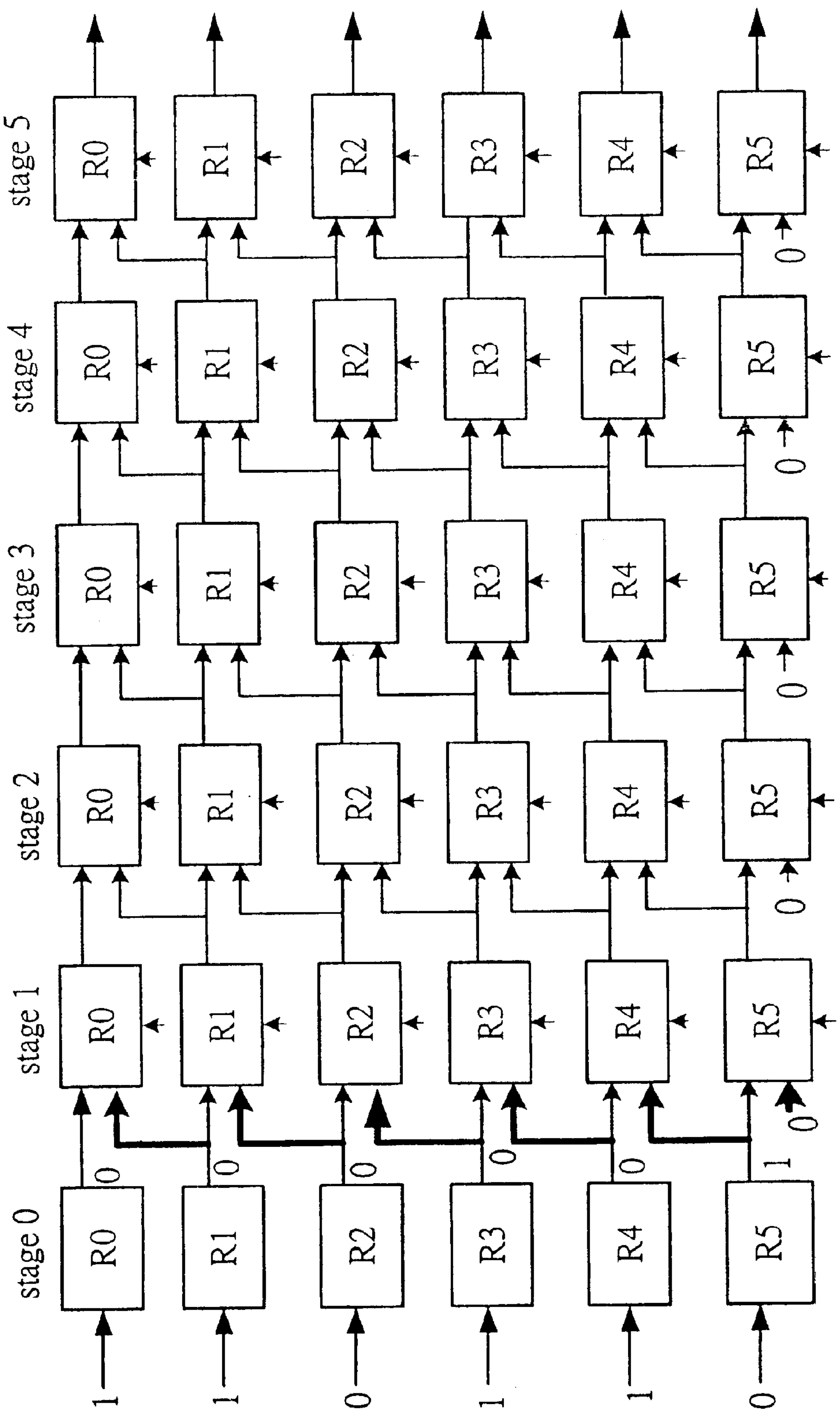
FIG. 2 shows a data flow status of the interconnection network of the pipelined bubble squeezer according to the present invention when a first set of the test results is input.

FIG. 2 shows a data flow status of the interconnection network of the pipelined bubble squeezer according to the present invention when a first set of the test results are input, wherein R0 to R4 buffering cells of the stage 0 are all logic 0, and R5 buffering cell of the stage 0 is logic 1.

Figure 3:
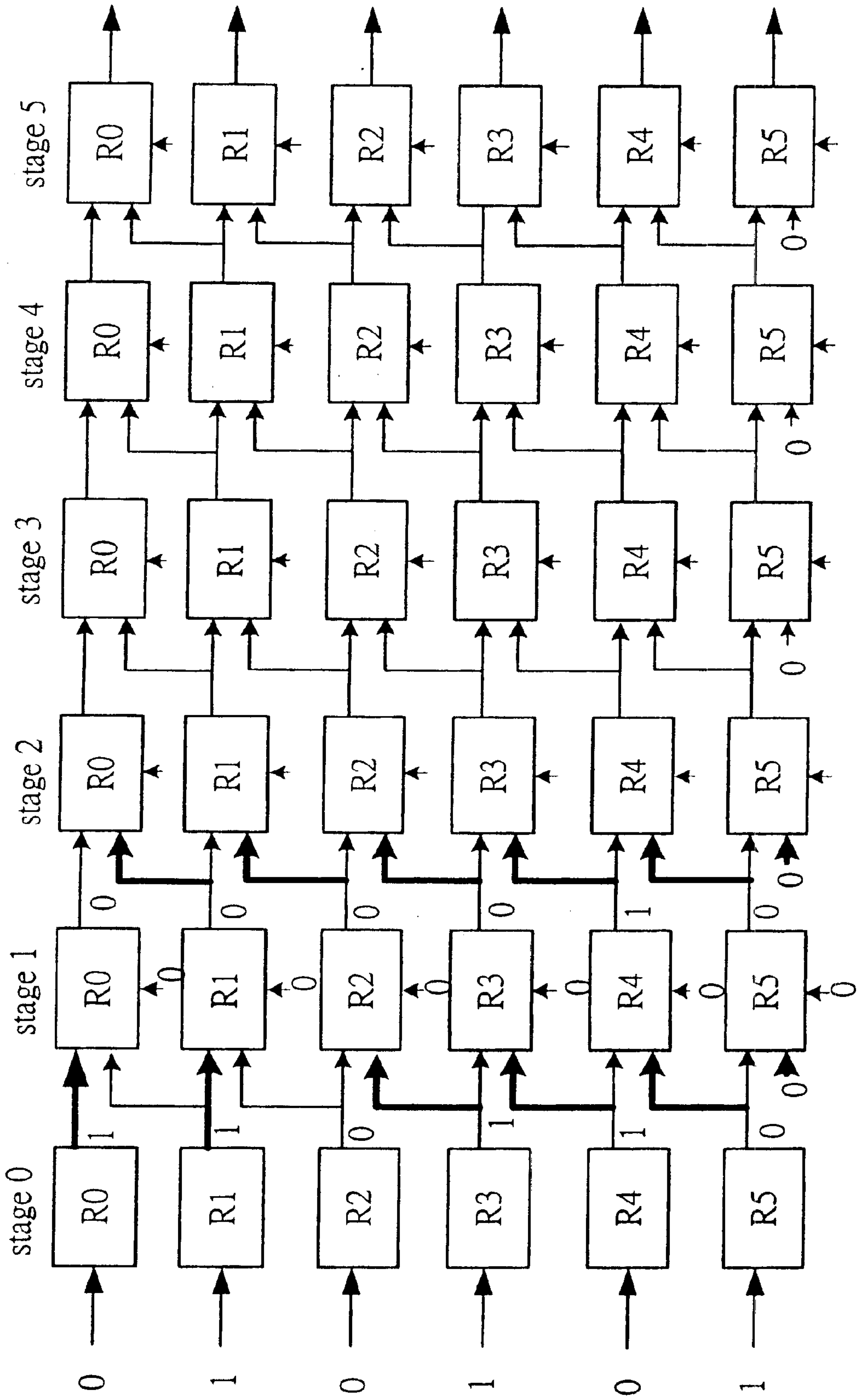
FIG. 3 shows a data flow status of the interconnection network of the pipelined bubble squeezer according to the present invention when a second set of the test results is input.

FIG. 3 shows a data flow status of the interconnection network of the pipelined bubble squeezer according to the present invention when the second set of the test results are input, wherein R0, R1, R3 and R4 buffering cells of the stage 0 are all logic 1, and R2 and R5 buffering cells of the stage 0 are all logic 0. Meanwhile, the first indication bits after the validity tests enter the stage 1. It can be clearly found that the logic 1 of R5 buffering cell of the stage 0 has popped up one row, and the output bit enters R4 multiplexing cell of the stage 1.

Figure 4:
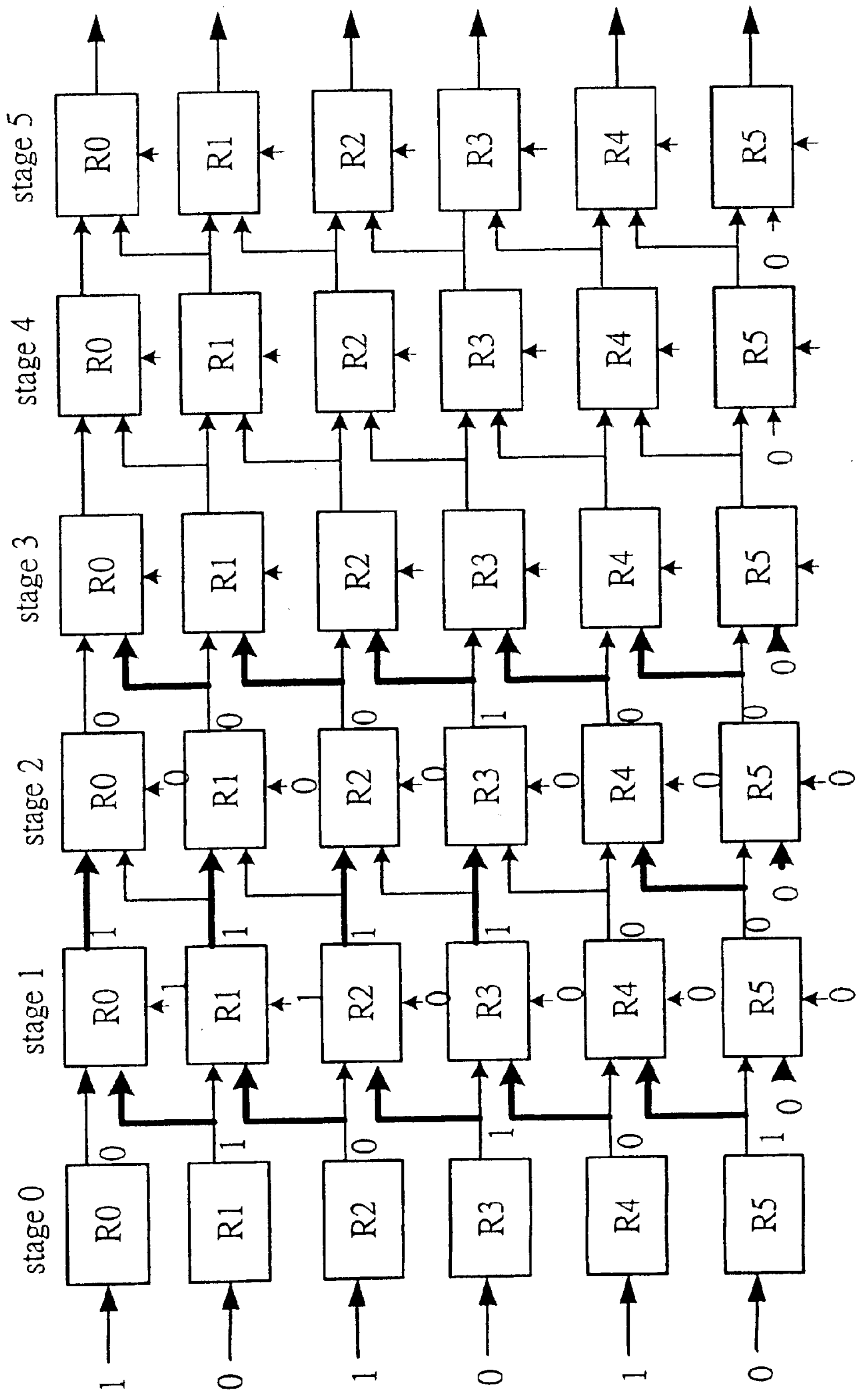
FIG. 4 shows a data flow status of the interconnection network of the pipelined bubble squeezer according to the present invention when a third set of the test results is input.

FIG. 4 shows a data flow status of the interconnection network of the pipelined bubble squeezer according to the present invention when the third set of the test results is input, wherein R0, R2 and R4 buffering cells of the stage 0 are all logic 0, and R1, R3 and R5 buffering cells of the stage 0 are all logic 1. Meanwhile, the group of the first indication bits after the validity tests enters the stage 2. It can be clearly found that the logic 1 of R4 buffering cell of the stage 1 in the previous step is popped up one row, and enters R3 multiplexing cell of the stage 2. The group of the second indication bits after the validity tests enters the stage 1. It can be clearly found that the logic 1 of R0 and R1 buffering cells of the stage 0 in the previous step have entered R0 and R1 multiplexing cells of the stage 1, and the logic 1 of R3 and R4 buffering cells of the stage 0 have popped up one row, and enters R2 and R3 multiplexing cells of the stage 1.

Figure 5:
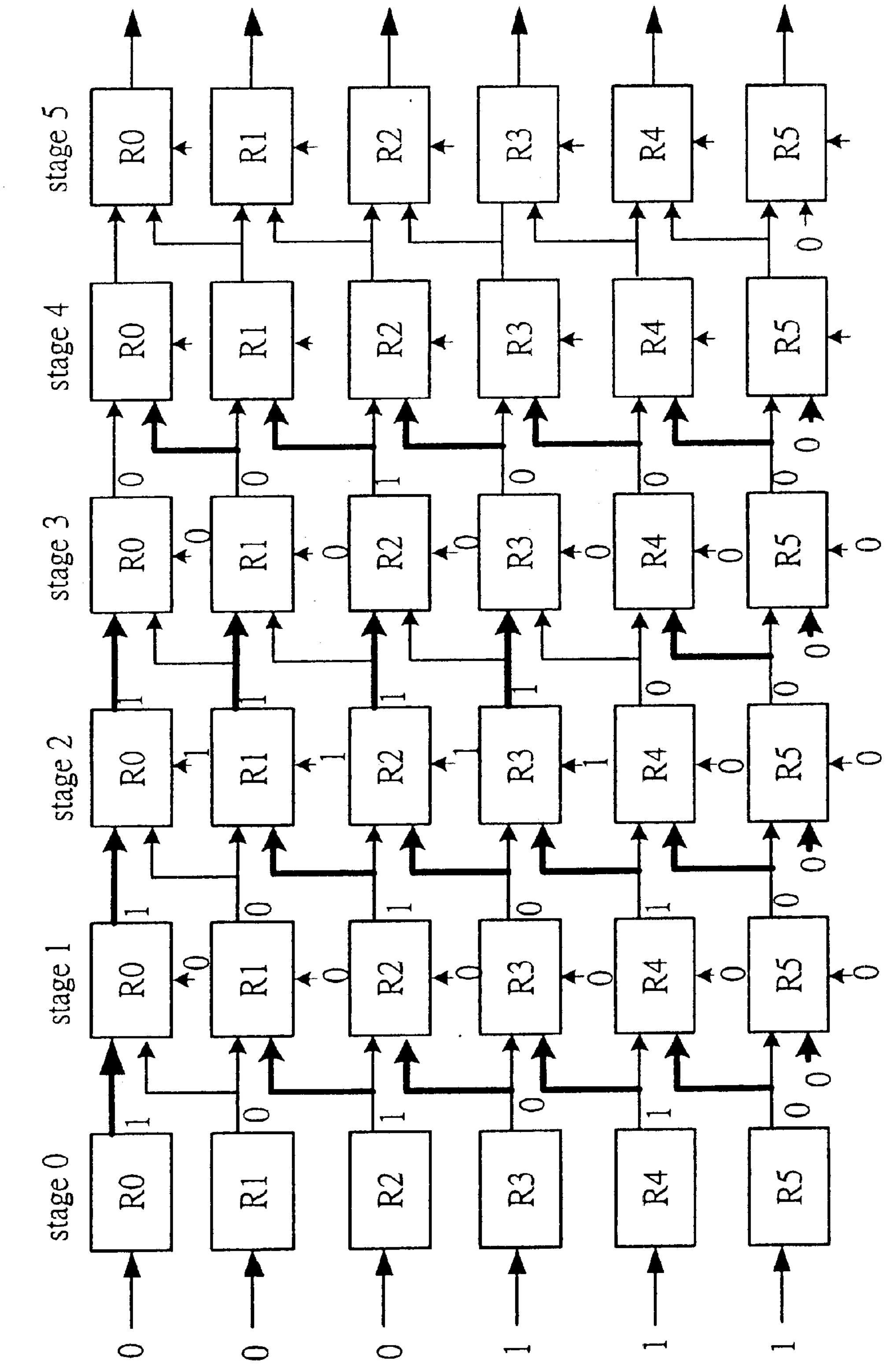
FIG. 5 shows a data flow status of the interconnection network of the pipelined bubble squeezer according to the present invention when a fourth set of the test results is input.
Figure 6:
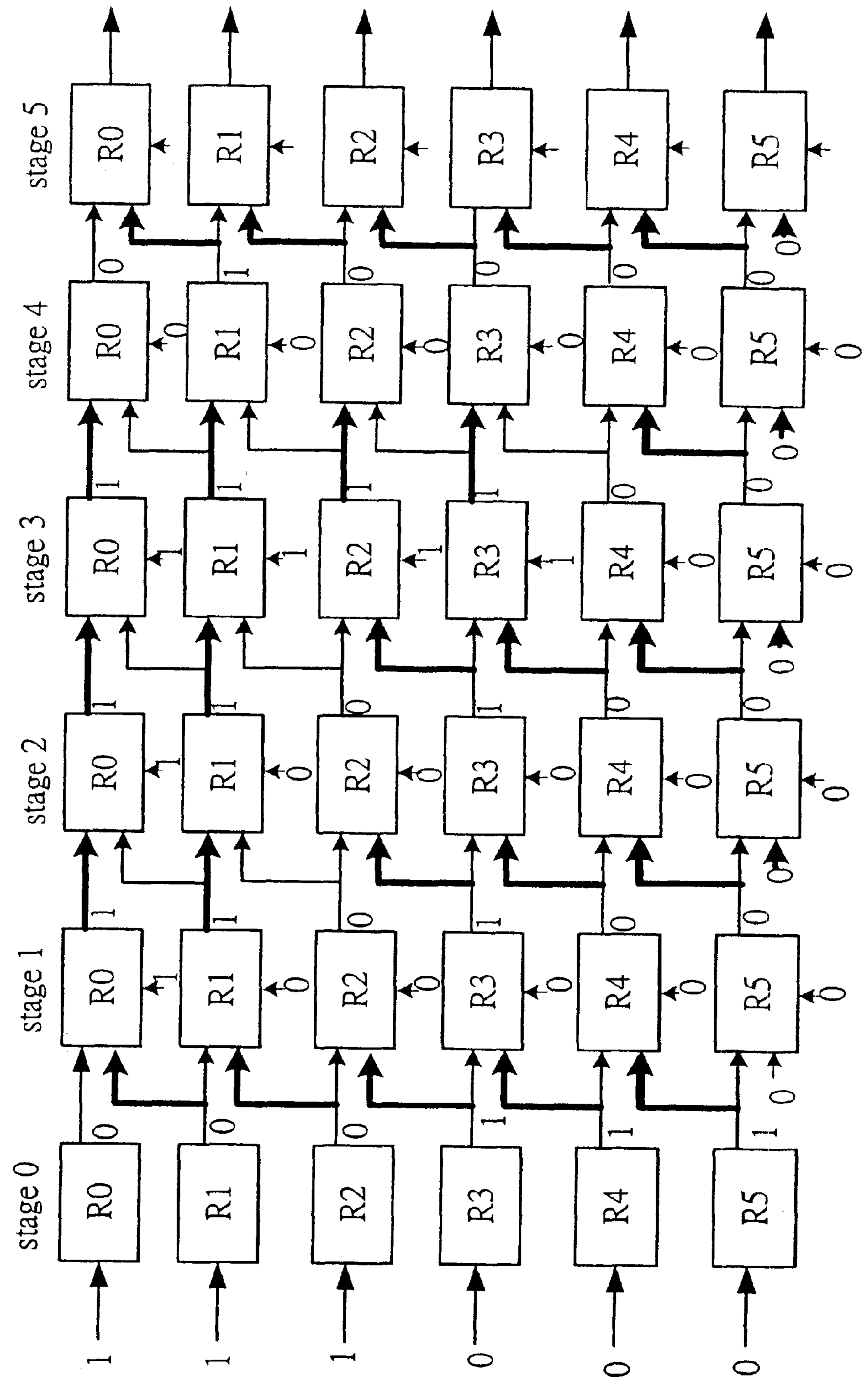
FIG. 6 shows a data flow status of the interconnection network of the pipelined bubble squeezer according to the present invention when a fifth set of the test results is input.
Figure 7:
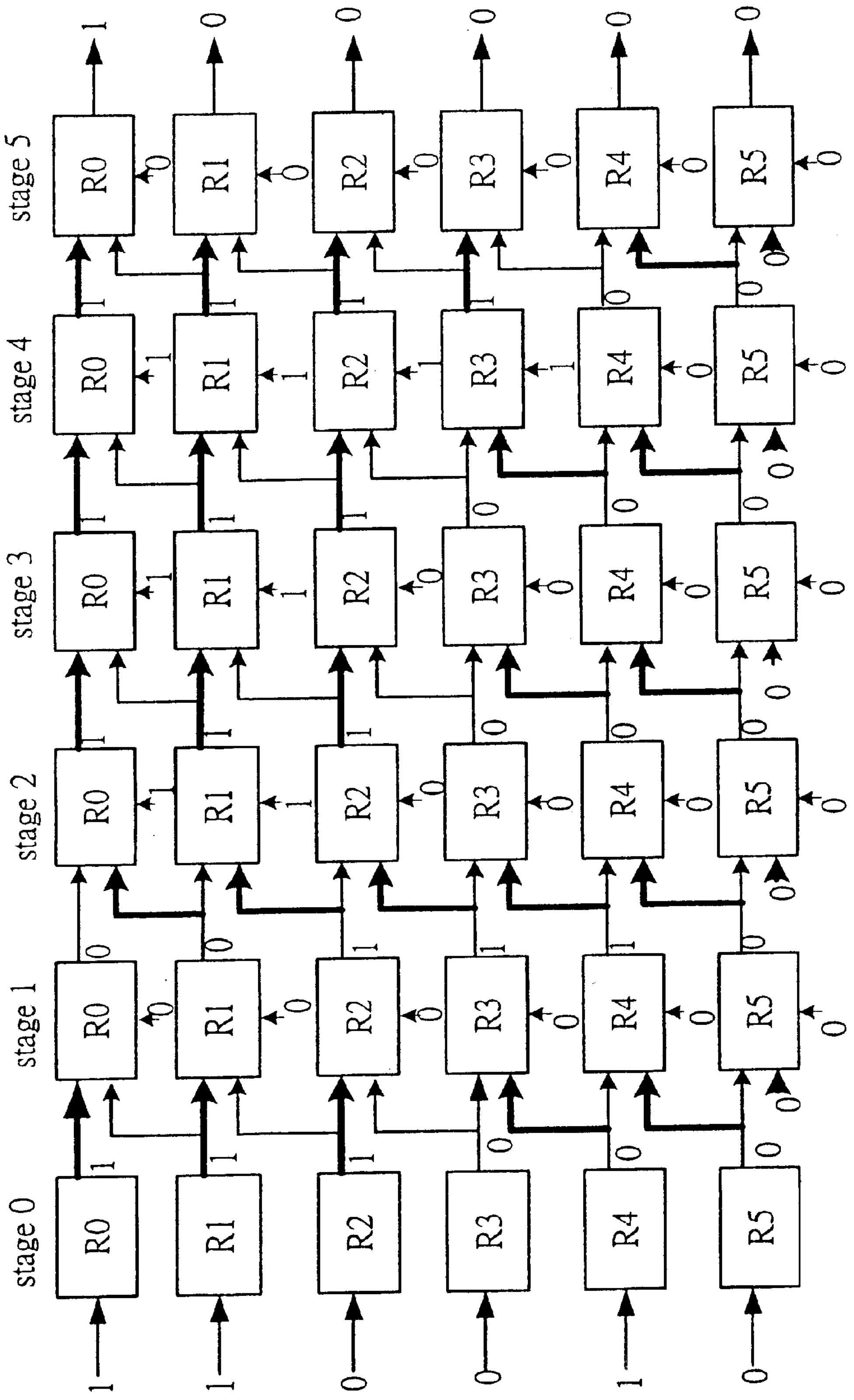
FIG. 7 shows a data flow status of the interconnection network of the pipelined bubble squeezer according to the present invention when a sixth set of the test results is input.

The same operation is carried out in FIG. 5–7. FIG. 5 shows a data flow status of the interconnection network of the pipelined bubble squeezer according to the present invention when the fourth set of the test results is input. FIG. 6 shows a data flow status of the interconnection network of the pipelined bubble squeezer according to the present invention when the fifth set of the test results is input. FIG. 7 shows a data flow status of the interconnection network of the pipelined bubble squeezer according to the present invention when the sixth set of the test results is input. In FIG. 7, the pipeline is filled by indication bits, and the outputs of stage 5 have been sorted into continuous logic 1 and continuous logic 0. The pixels of the indication bits which are continuous logic 1 are only needed to be push into a frame buffer (not shown) for the use in a rendering process of 3D computer graphic system. The pixels of the indication bits which are logic 0 will be discarded to increase the utilization rate of the system.

The method of the pipelined bubble squeezing according to the present invention can be easily implemented by software. Because of the simplicity of architecture, less operations and regular structure, the software implementation has the same advantage as hardware. The following algorithm is an embodiment according to the present invention, wherein the indication bits pass 0, pass 1, . . . , pass (n−1) of parallel input are sorted into continuous logic 1 and continuous logic 0. The pixels whose indication bits are logic 0 will be extracted and sorted out later from the rendering process of 3D computer graphic process to increase the utilization of the 3D computer graphic system. The method uses a loop routine to get the above-mentioned results. At each do loop, the indication bits input in parallel which are logic 1 will make a displacement towards the direction of lower bit order. After (n−1)loops are performed, the n logic bits input in parallel will be sorted into continuous logic 1 and logic 0, behaved like a bubble floating upwards due to being squeezed.

```
for (i=1;i < n;i=i+1)
{
/* pass 0 ~ pass (n−1) are input indication
  bits, valid 0 ~ valid (n−1) are related
  control signals */
   valid 0= pass 0
   valid 1= valid 0 AND pass 1
   valid 2= valid 1 AND pass 2
     . . . . . . . . . . . .
   valid (n−1)= valid (n−2) AND pass (n−1)
/* the indication bits input in parallel which
  are logic 1 will make a displacement
  upwards */
   if (valid 0 ==1)
      pass 0 = pass 0
   else
      pass 0 = pass 1
   if (valid 1 ==1)
      pass 1 = pass 1
   else
      pass 1 = pass 2
   if (valid 2 ==1)
      pass 2 = pass 2
   else
      pass 2 = pass 3
      . . . . . . . . . . . .
   if (valid (n−1) ==1)
      pass (n−1) = pass (n−1)
   else
      pass (n−1) = 0
}
```

The method or algorithm of the pipelined bubble squeezer according to the present invention can be saved in any computer readable storage medium, such as floppy, compact disk, hard disk or any kind of memory.

The above-described embodiments of the invention are intended to be illustrated only. Numerous alternative embodiments may be devised by those skilled in the art without departing from the scope of the following claims.

What is claimed is:

1. A pipelined bubble squeezer for sorting n indication bits which are input in parallel into continuous logic 1's and/or continuous logic 0's, said pipelined bubble squeezer comprising an interconnection network of n×n cells, said interconnection network comprising a 0-th buffering stage composed of n buffering cells numbered as from R0 to R(n−1), and first to (n−1)th multiplexing stages composed of n×(n−1) multiplexing cells numbered as R0 to R(n−1), each one of said plurality of buffering cells including a buffer, each one of said plurality of multiplexing cells including a multiplexer, the logic value of selecting signals (valid 0~valid (n−1)) of said multiplexers being determined by the following equations:

valid 0=the logic value of the upper input of R0 multiplexer valid 1=the logic value of the upper input of R1 multiplexer AND valid 0 valid 2=the logic value of the upper input of R2 multiplexer AND valid 1

. . .

valid (n−1)=the logic value of the upper input of R(n−1) multiplexer AND valid (n−2)

wherein valid 0 is the selecting signal of R0 multiplexer of row 0, valid 1 is the selecting signal of R1 multiplexer of row 1, valid 2 is the selecting signal of R2 multiplexer of row 2, valid (n−1) is the selecting signal of R(n−1) multiplexer of row (n−1); if one of the selecting signals of said multiplexers is logic 1, then the upper input of said multiplexer is selected; otherwise, the lower input of said multiplexer is selected.

2. The squeezer of claim 1, wherein said buffering cells each further comprises a D flip flop coupled to the buffer associated with the buffering cell, said multiplexing cells each further comprises a D flip flop coupled to the multiplexer associated with the multiplexing cell.

3. A method for squeezing pipelined bubbles, for use in a 3D computer graphic processing system and sorting n indication bits (pass 0, pass 1, pass 2 . . . , pass (n−1)) which are input in parallel into continuous logic 0's and continuous logic 1's as a sorted result; said indication bits of continuous logic 0's are sorted out from entering the rendering process of the system to increase the efficiency of the system; said method comprising the following steps: (1) inputting said indication bits pass 0~pass (n−1); and (2) using do loop algorithm to get the result, each loop enabling the indication bits of logic 1 to move towards the lower order bit by one; after (n−1) steps are repeated, the n indication bits being output are sorted into continuous logic 1's and continuous logic 0's.

4. The method of claim 3, wherein said do loop algorithm is carried out by the following algorithm:

```
for (i=1;i < n;i=i+1)
{
   valid 0= pass 0
   valid 1= valid 0 AND pass 1
   valid 2= valid 1 AND pass 2
     . . . . . . . . . . . .
   valid (n−1)= valid (n−2) AND pass (n−1)
   if (valid 0 ==1)
      pass 0 = pass 0
   else
      pass 0 = pass 1
   if (valid 1 ==1)
      pass 1 = pass 1
   else
      pass 1 = pass 2
   if (valid 2 ==1)
      pass 2 = pass 2
   else
      pass 2 = pass 3
      . . . . . . . . . . . .
   if (valid (n−1) ==1)
      pass (n−1) = pass (n−1)
   else
      pass (n−1) = 0
}.
```

5. A computer readable storage medium for recording a program of executing a pipelined bubble squeezing, for use in a 3D computer graphic processing system and sorting n indication bits (pass 0, pass 1, pass 2 . . . , pass (n−1)) which are input in parallel into continuous logic 0's and continuous logic 1's as a sorted result; said indication bits of continuous logic 0's are sorted out from entering the rendering process of the system to increase the efficiency of the system; said method comprising the following steps: (1) inputting said indication bits pass 0~pass (n−1); and (2) using do loop algorithm to get the result each loop enabling the indication bits of logic 1 to move towards the lower order bit by one; after (n−1) steps are repeated, the n indication bits being output are sorted into continuous logic 1's and continuous logic 0's.

6. The medium of claim 5, wherein said do loop algorithm is carried out by the following program:

```
for (i=1;i < n;i=i+1)
{
   valid 0= pass 0
   valid 1= valid 0 AND pass 1
   valid 2= valid 1 AND pass 2
      . . . . . . . . . . . .
```

-continued

```
   valid (n−1)= valid (n−2) AND pass (n−1)
   if (valid 0 ==1)
      pass 0 = pass 0
   else
      pass 0 = pass 1
   if (valid 1 ==1)
      pass 1 = pass 1
   else
      pass 1 = pass 2
   if (valid 2 ==1)
      pass 2 = pass 2
   else
      pass 2 = pass 3
      . . . . . . . . . . . .
   if (valid (n−1) ==1)
      pass (n−1) = pass (n−1)
   else
      pass (n−1) = 0
}.
```

* * * * *